United States Patent

Lomas

[11] Patent Number: 6,139,720
[45] Date of Patent: Oct. 31, 2000

[54] FCC PROCESS WITH CARBON MONOXIDE MANAGEMENT AND HOT STRIPPING

[75] Inventor: David A. Lomas, Barrington, Ill.

[73] Assignee: UOP LLC, Des Plaines, Ill.

[21] Appl. No.: 09/253,442

[22] Filed: Feb. 19, 1999

[51] Int. Cl.[7] .............................. C10G 11/00; C10G 35/00
[52] U.S. Cl. ......................... 208/113; 208/106; 208/151; 208/164
[58] Field of Search ................................... 208/106, 113, 208/151, 164

[56] References Cited

U.S. PATENT DOCUMENTS

| | | | |
|---|---|---|---|
| 4,234,411 | 11/1980 | Thompson | 208/74 |
| 4,455,220 | 6/1984 | Parker et al. | 208/161 |
| 4,464,250 | 8/1984 | Myers et al. | 208/120 |
| 4,789,458 | 12/1988 | Haddad et al. | 208/151 |
| 5,043,517 | 8/1991 | Haddad et al. | 585/533 |
| 5,141,625 | 8/1992 | Lomas | 208/113 |

*Primary Examiner*—Walter D. Griffin
*Assistant Examiner*—Tam M. Nguyen
*Attorney, Agent, or Firm*—John G. Tolomei

[57] ABSTRACT

The production of carbon monoxide as a combustion off-gas is maximized by the use of a hot stripping zone arrangement that provides catalyst mixing to establish a uniform catalyst temperature and thorough contacting of the well-mixed hot catalyst in a confined portion of the hot stripping zone. The hot stripping zone delivers the hot stripped catalyst to a bubbling-bed regeneration zone by an oxygen-starved lift stream that distributes the catalyst to the top of the bubbling-bed in the regeneration zone. The process delivers spent catalyst with about 1 wt % of coke to the reaction zone and a spent combustion gas or flue gas stream having a $CO_2$ to CO ratio of at least 1. The operation reduces the heat evolution in the regeneration step and allows relatively low temperature operation of the regeneration zone without use of catalyst coolers.

13 Claims, 1 Drawing Sheet

FCC PROCESS WITH CARBON MONOXIDE MANAGEMENT AND HOT STRIPPING

FIELD OF THE INVENTION

This invention relates generally to processes for the fluidized catalytic cracking (FCC) of heavy hydrocarbon streams such as vacuum gas oil and reduced crudes. This invention relates more specifically to a methods for reacting hydrocarbons in an FCC reactor, separating reaction products from the catalyst used therein and regenerating the used catalyst.

BACKGROUND OF THE INVENTION

The fluidized catalytic cracking of hydrocarbons is a primary process for the production of gasoline and light hydrocarbon products from heavy hydrocarbon charge stocks such as vacuum gas oils or residual feeds. Large hydrocarbon molecules, associated with the heavy hydrocarbon feed, are cracked to break the large hydrocarbon chains thereby producing lighter hydrocarbons. These lighter hydrocarbons are recovered as product and can be used directly or further processed to raise the octane barrel yield relative to the heavy hydrocarbon feed.

The basic equipment or apparatus for the fluidized catalytic cracking of hydrocarbons has been in existence since the early 1940's. The basic components of the FCC process include a reactor, a regenerator and a catalyst stripper. The reactor includes a contact zone where the hydrocarbon feed is contacted with a particulate catalyst and a separation zone where product vapors from the cracking reaction are separated from the catalyst. Further product separation takes place in a catalyst stripper that receives catalyst from the separation zone and removes entrained hydrocarbons from the catalyst by counter-current contact with steam or another stripping medium. The FCC process is carried out by contacting the starting material whether it be vacuum gas oil, reduced crude, or another source of relatively high boiling hydrocarbons with a catalyst made up of a finely divided or particulate solid material. The catalyst is transported like a fluid by passing gas or vapor through it at sufficient velocity to produce a desired regime of fluid transport. Contact of the oil with the fluidized material catalyzes the cracking reaction. During the cracking reaction, coke will be deposited on the catalyst. Coke is comprised of hydrogen and carbon and can include other materials in trace quantities such as sulfur and metals that enter the process with the starting material. Coke interferes with the catalytic activity of the catalyst by blocking active sites on the catalyst surface where the cracking reactions take place. Catalyst is traditionally transferred from the stripper to a regenerator for purposes of removing the coke by oxidation with an oxygen-containing gas. An inventory of catalyst having a reduced coke content, relative to the catalyst in the stripper, hereinafter referred to as regenerated catalyst, is collected for return to the reaction zone. Oxidizing the coke from the catalyst surface releases a large amount of heat, a portion of which escapes the regenerator with gaseous products of coke oxidation generally referred to as flue gas. The balance of the heat leaves the regenerator with the regenerated catalyst. The fluidized catalyst is continuously circulated from the reaction zone to the regeneration zone and then again to the reaction zone. The fluidized catalyst, as well as providing a catalytic function, acts as a vehicle for the transfer of heat from zone to zone. Catalyst exiting the reaction zone is spoken of as being spent, i.e., partially deactivated by the deposition of coke upon the catalyst. Specific details of the various contact zones, regeneration zones, and stripping zones along with arrangements for conveying the catalyst between the various zones are well known to those skilled in the art.

The hydrocarbon product of the FCC reaction is recovered in vapor form and transferred to product recovery facilities. These facilities normally comprise a main column for cooling the hydrocarbon vapor from the reactor and for recovering a series of heavy cracked products which usually include bottom materials, cycle oil, and heavy gasoline. Lighter materials from the main column enter a concentration section for further separation into additional product streams.

As the development of FCC units has advanced, temperatures within the reaction zone were gradually raised. It is now commonplace to employ temperatures of about 525° C. (975° F.). At higher temperatures, there is generally a loss of gasoline components as these materials crack to lighter components by both catalytic and strictly thermal mechanisms. At 525° C., it is typical to lose 1% on the potential gasoline yield due to gasoline components thermally cracking into lighter hydrocarbon gases. As temperatures increase, to say 1025° F. (550° C.), most feedstocks lose up to 6% or more of the gasoline yield due to thermal cracking of gasoline components.

One improvement to FCC units, that has reduced the loss of product by thermal cracking, is the use of riser cracking. In riser cracking, regenerated catalyst and starting materials enter a pipe reactor and are transported upwardly by the expansion of the gases that result from the vaporization of the hydrocarbons, and other fluidizing mediums, if present, upon contact with the hot catalyst. Riser cracking provides good initial catalyst and oil contact and also allows the time of contact between the catalyst and oil to be more closely controlled by eliminating turbulence and backmixing that can vary the catalyst residence time. An average riser cracking zone today will have a catalyst to oil contact time of 1 to 5 seconds.

Further improvements in reduction of product losses and the control of regeneration temperatures have been achieved by providing multiple stages of catalyst stripping and raising the temperature at which the catalyst particles are stripped of products and other combustible compounds. Both of these methods will increase the amount of low molecular weight products that are stripped from the catalyst and will reduce the quantity of combustible material in the regenerator. A variety of arrangements are known for providing multiple stages of stripping and heating the spent catalyst to raise the temperature of the stripping zone. With increasing frequency it is being proposed to raise the temperature of the stripping zone by mixing the spent catalyst with hot regenerated catalyst from the regeneration zone.

Reductions in the availability of relatively light FCC feeds has made it necessary at times to process feeds in FCC units that have higher molecular weights. The higher molecular weight feeds have an increased tendency to lay down coke deposits on the catalyst in the reaction zone and to carry over light combustible products from the reaction zone to the regeneration zone. Increased production of coke and the combustion of relatively low molecular weight cracking products generate more heat in the regenerator as the coke is burned from the surface of the catalyst. The resulting higher catalyst temperatures can adversely influence the catalyst to oil ratio in the reactor riser and result in catalyst deactivation. A number of regeneration techniques are practiced to minimize or remove the heat released by the combustion of large amounts of coke in the regenerator.

These methods include the direct removal of heat by the use of catalyst coolers that use a cooling fluid to cool the catalyst by indirect heat exchange and by the operation of the regeneration of the regeneration zone to limit the combustion of CO to $CO_2$.

DISCLOSURE STATEMENT

U.S. Pat. No. 4,234,411, issued to Thompson on Nov. 18, 1980, discloses a reactor riser disengagement vessel and stripper that receives two independent streams of catalyst from a regeneration zone.

U.S. Pat. No. 4,464,250, issued to Myers et al. and U.S. Pat. No. 4,789,458, issued to Haddad et al. teach the heating of spent catalyst particles to increase the removal of hydrocarbons, hydrogen and/or carbon from the surface of spent catalyst particles by heating the catalyst particles after initial stripping of hydrocarbons in the stripping zone of an FCC unit.

U.S. Pat. No. 4,789,458, issued to Haddad et. al. discloses the use of a second stage of stripping in a second stripping zone located subadjacent to a regeneration zone for the removal of hydrogen, hydrocarbons, and sulfur compounds from FCC catalyst before it passes into the regeneration zone.

U.S. Pat. No. 5,141,625, issued to Lomas shows dual stripping arrangement that passes catalyst from a baffle section of a hot stripping zone to a catalyst bed in a super adjacent regeneration zone.

BRIEF DESCRIPTION OF THE INVENTION

It is an object of this invention to maximize CO production in an FCC production that incorporates hot stripping.

This invention is an FCC process that uses a hot stripping zone to prepare and deliver spent FCC catalyst for regeneration in a manner that will maximize the production of CO. This operation reduces the heat evolution in the regeneration step and allows relatively low temperature operation of a regeneration zone without expansive use of catalyst coolers or heat withdrawal devices. The hot stripper operates efficiently in a two stage operation. The first stage thoroughly mixes spent and regenerated catalyst to obtain a uniform catalyst temperature. A confirmed volume of the hot stripper provides a second stage that fully contacts the catalyst with a stripping gas to maximize its effectiveness. A transfer conduit withdraws catalyst from the hot stripping zone and transports it with a transport fluid that contains a limited amount of oxygen. The transport conduit discharges the hot stripped catalyst into a catalyst bed of the regeneration zone. A well distributed oxygen-containing stream passes upwardly through the bed and combusts coke from the catalyst. Limiting the amount of oxygen that enters the bed of the regeneration zone results in the principal conversion of coke to CO and limits the production of $CO_2$. Good distribution of the oxygen-containing gas and the addition of the hot stripped catalyst to the top of the catalyst bed prevents the break-through of oxygen and further limits CO conversion in the dilute phase zone above the bed.

Accordingly, in one embodiment this invention is a process for the fluidized catalytic cracking of hydrocarbons. The process reacts hydrocarbons in an FCC reactor, separates reaction products from the catalyst used therein, and regenerates the used catalyst. Fluidized particles of regenerated FCC catalyst contact the hydrocarbon feed at hydrocarbon conversion conditions. The hydrocarbons in the feed are converted to lower boiling hydrocarbons producing a mixture of FCC catalyst and converted hydrocarbons. The mixture of FCC catalyst and converted hydrocarbons are separated into a first gaseous effluent and a separated catalyst. The first gaseous effluent is recovered from the process. The separated catalyst carries adsorbed and/or entrained hydrocarbons which pass to a prefatory stripping zone and contact the particles with a stripping gas. The stripping gas strips the hydrocarbons from the separated FCC catalyst and from the void volume between the catalyst to produce initially stripped catalyst and a stripper stream comprising displaced hydrocarbons and stripping fluid that is recovered from the process. The initially stripped catalyst and the regenerated catalyst are mixed by injecting a fluidizing gas into a first segregated volume of the heated stripping zone. Contacting the initially stripped and regenerated catalyst with the fluidizing gas further strips the heated stripped catalyst to produce a heated stripping catalyst. A second segregated volume of the heated stripping zone is infilled with the heated stripping catalyst by withdrawing hot stripped catalyst from the bottom of the second segregated volume. Contacting the heated stripping catalyst with the final stripping fluid in the second segregated volume strips additional strippable compounds from the heated stripping catalyst and produces the hot stripped catalyst. A light gas stream comprising fluidizing gas, stripping fluid, light hydrocarbons, and gaseous sulfur and nitrogen compounds is recovered from the heated stripping zone. A transport fluid is injected into a regenerator transport conduit to withdraw hot stripped catalyst from the bottom of the second segregated volume and to transport the hot stripped catalyst into a regenerator zone. A stream of partially regenerated catalyst and gas from the transport conduit is discharged into an upper portion of a dense bubbling bed of catalyst which is part of a regeneration zone. The discharged gas has an oxygen concentration of less than 5 mol %. An oxygen-containing regeneration gas passes upwardly through the catalyst bed to regenerate the catalyst and to produce regenerated catalyst particles for contact with the hydrogen feed, and finally, a flue gas having a $CO_2/CO$ ratio of at least 1 is collected from the regeneration zone.

The amount of fuel entering the regeneration zone in the form of hydrogen and relatively light hydrocarbons is essentially eliminated so that the total heat value of the stripped catalyst entering the regeneration zone is at least 30 percent less than the heat value of catalyst that normally enters the regeneration zone from less complete stripping operations. With the lower heat value of the catalyst, a single-stage regeneration zone can provide regenerated catalyst having a nearly complete removal of coke at a temperature below 1350° F. The relatively low regenerator temperature prevents catalyst deactivation which in turn allows the use of additional stages of stripping on the catalyst that leaves the regeneration zone.

Other objects, embodiments and details of this invention can be found in the following detailed description of the invention.

DETAILED DESCRIPTION OF THE INVENTION

Figure 1:
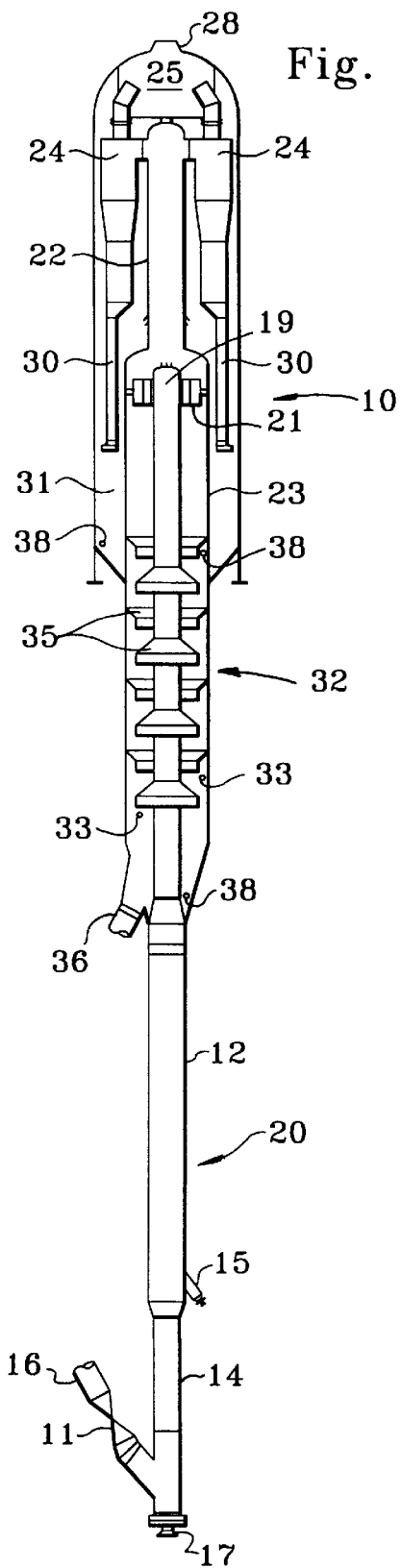
FIG. 1 is a sectional elevation of a typical FCC reactor riser, reactor vessel, and stripping zone.

The process and apparatus of this invention will be described with references to the drawings. Reference to the specific configurations shown in the drawings is not meant to limit the process of this invention to the particular details of the drawing disclosed in conjunction therewith.

FIG. 1 shows a reactor 10 with a vertical riser 20 having an upper section 12 and a lower riser portion 14 into which a regenerator standpipe 16 transfers catalyst from the regenerator at a rate regulated by a slide valve 11. A fluidization medium enters the riser through a nozzle 17 and through a suitable distribution device (not shown). The fluidizing medium may be a diluent material, typically steam, a hydrocarbon stream that undergoes some conversion, or a lift gas. The fluidized catalyst flows upwardly through lower riser portion 14 at a relatively high density until it reaches a plurality of feed injection nozzles 15 (only one is shown) that inject a hydrocarbon feed across the flowing stream of catalyst particles. Upper riser section 12 has a larger internal diameter than lower section 14 to accommodate the volumetric expansion of the feed as it expands through contact with the hot catalyst. While the resulting mixture—which has a temperature of from about 400° F. (200° C.) to about 1300° F. (700° C.)—passes up through the remainder of the riser, conversion of the feed to lighter products occurs and coke is deposited on the catalyst.

The catalysts which can be used in the process of this invention include those known to the art as fluidizing catalytic cracking catalysts. These compositions include amorphous clay-type catalysts which have for the most part been replaced by high activity crystalline alumina silicate or zeolite-containing catalysts. Zeolite catalysts are preferred over amorphous-type catalysts because of their higher intrinsic activity and their higher resistance to the deactivating effects of high temperature exposure to steam and exposure to the metals contained in most feedstocks. Zeolites are the most commonly used crystalline alumina silicates and are usually dispersed in a porous inorganic carrier material such as silica, aluminum, or zirconium. These catalyst compositions may have a zeolite content of 30% or more.

Feeds suitable for processing by this invention, include conventional FCC feedstocks or higher boiling hydro carbon feeds. The most common of the conventional feedstocks is a vacuum gas oil which is typically a hydrocarbon material having a boiling range of from 650–1025° F. and is prepared by vacuum fractionation of atmospheric residue. Such fractions are generally low in coke precursors and heavy metals which can deactivate the catalyst.

This invention is also useful for processing heavy or residual charge stocks, i.e., those boiling above 930° F. which frequently have a high metals content and which usually cause a high degree of coke deposition on the catalyst when cracked. Both the metals and coke deactivate the catalyst by blocking active sites on the catalyst. Coke can be removed and its deactivating effects overcome, to a desired degree, by regeneration. Metals, however, accumulate on the catalyst and poison the catalyst by fusing within the catalyst and permanently blocking reaction sites. In addition, the metals promote undesirable cracking thereby interfering with the reaction process. Thus, the presence of metals usually influences the regenerator operation, catalyst selectivity, catalyst activity, and the fresh catalyst make-up required to maintain constant activity. The contaminant metals include nickel, iron and vanadium. In general, these metals affect selectivity in the direction of less gasoline and more coke. Due to these deleterious effects, metal management procedures within or before the reaction zone may be used when processing heavy feeds by this invention. Metals passivation can also be achieved to some extent by the use of appropriate lift gas in the upstream portion of the riser.

The finely divided, regenerated catalyst entering the bottom of a reactor riser leaves the regeneration zone at a temperature usually in the range of 1200–1400° F. Where the riser is arranged vertically, the bottom section will be the most upstream portion of the riser. In most cases, the riser will have a vertical arrangement wherein lift gas and catalyst enter the bottom of the riser, and converted feed and catalyst leave the top of the riser. Nevertheless, this invention can be applied to any configuration of riser including curved and inclined risers. The only limitation in the riser design is that it provides a substantially smooth flow path over its length.

Contact of the hot catalyst with the lift gas accelerates the catalyst up the riser in a uniform flow regime that will reduce backmixing at the point of feed addition. Reducing backmixing is important because it varies the residence time of hydrocarbons in the riser. Addition of the lift gas at a velocity of at least 3 feet per second is necessary to achieve a satisfactory acceleration of the catalyst. The lift gas is more effective when it comprises $C_3$ and lower molecular weight hydrocarbons and is particularly more effective when it includes not more than 10 mol % of $C_3$ and heavier olefinic hydrocarbons. Low molecular weight hydrocarbons in the lift gas are believed to selectively passivate active metal contamination sites on the catalyst to reduce the hydrogen and coke production effects of these sites. Selectively passivating the sites associated with the metals on the catalyst leads to greater selectivity and lower coke and gas yield from a heavy hydrocarbon charge. Some steam may be included with the lift gas and, in addition to hydrocarbons, other reaction species may be present in the lift gas such as $H_2$, $H_2S$, $N_2$, CO, and/or $CO_2$. However, to achieve maximum effect from the lift gas, it is important to maintain appropriate contact conditions in the lower portion of the riser. A residence time of 0.5 seconds or more is preferred in the lift gas section of the riser, however, where such residence time would unduly lengthen the riser, shorter residence times for the lift gas and catalyst may be used. A weight ratio of catalyst to hydrocarbon in the lift gas of more than 80 is also preferred.

After the catalyst is accelerated by the lift gas, it enters a downstream portion of the riser which is generally referred to as the upper section. Feed may be injected into the start of the upper section by nozzles as shown in FIG. 1 or by any device that will provide a good distribution of feed over the entire cross-section of the riser. Atomization of the feed as it enters the riser promotes good distribution of the feed. A variety of distributor nozzles and devices are known for atomizing feed as it is introduced into the riser. Such nozzles or injectors may use homogenizing liquids or gas which are combined with the feed to facilitate atomization and dispersion. Steam or other non-reactive gases may also be added with the feed for purposes of establishing a desired superficial velocity up the riser. The superficial velocity must be relatively high in order to produce an average residence time of less than 5 seconds for the hydrocarbons in the riser. Shorter residence times permit the use of higher reaction temperatures and provide additional benefits as discussed below; thus where possible, the feed has a residence time of 2 seconds or less. In more limited embodiments of this invention, the residence time may be less than 1 second.

The catalyst and feed mixture has an average temperature in a range of from 850–1050° F. A combination of a short residence time and higher temperatures in the riser shifts the process towards primary reactions. These reactions favor the production of gasoline and tend to reduce the production of coke and light gases. Furthermore, a higher temperature raises gasoline octane. A short catalyst residence time within the riser is also important for maintaining the shift towards primary reactions and removing the hydrocarbons from the presence of the catalyst before secondary reactions that favor coke and light gas production have time to occur.

The high velocity stream of catalyst and hydrocarbons is then rapidly separated at the end of the riser. This can be accomplished by passing the stream of catalyst and hydrocarbons directly into a cyclonic separation system or into any other type of centrifugal separation arrangements that may be provided at the end of the riser. The separated vapors travel toward the product recovery zone while the separated catalyst is directed toward the stripping zone.

FIG. 1, shows the effluent from the riser discharged from the top 19 of riser 20 through a disengaging arm 21 that tangentially discharges the mixture of catalyst and gases into a disengaging chamber 23 to effect a separation of the gases from the catalyst. A transport conduit 22 carries the hydrocarbon vapors and entrained catalyst to one or more cyclone separators 24 that separate any spent catalyst from the hydrocarbon vapor stream.

A collection chamber 25 gathers the separated hydrocarbon vapor streams from the cyclone for passage from an outlet nozzle 28 into a fractionation zone (not shown) known in the art as the main column. The main column separates the hydrocarbon vapors into such typical fractions as light gases and gasoline, light cycle oil, heavy cycle oil and slurry oil. Various fractions from the main column can be recycled along with the feedstock to the reactor riser. Typically, fractions such as light gases and gasoline are further separated and processed in a gas concentration process located downstream of the main column. Some of the fractions from the main column as well as those recovered from the gas concentration process may be recovered as final product streams.

The separated spent catalyst from cyclones 24 passes through dip legs 30 into the lower portion of collection space 31 and eventually passes into a stripping zone 32 across ports (not shown) defined by the bottom of disengaging chamber 23. Catalyst separated in disengaging chamber 23 passes directly into stripping zone 32. A stripping gas, usually steam, enters a lower portion of stripping zone 32 through an inlet 33 and may be distributed by one or more distributors (not shown). Stripping gas, in its usual form of steam, is added to the stripping vessel in an amount equaling 0.5 to 2 wt. % of the feed charged to the riser. The stripping gas contacts the spent catalyst to purge adsorbed and interstitial hydrocarbons from the catalyst. Stripping zone 32 serves as an initial stripping zone and displaces entrained vapor from the void areas between the catalyst particles and from the surface of the catalyst. Additional gas for fluidization or stripping may be added through one or more inlets 38. Stripping zone 32 usually operates without any external heat input so that, apart from the cooling effects of the stripping gas, stripping zone 32 operates in a substantially adiabatic manner. Stripping zone 32 is arranged principally vertically and has a number of vertically spaced baffles 35. Some of baffles 35 extend outwardly and downwardly from the riser 12. The remaining baffles are offset from others and extend inwardly and downwardly from the outer wall of stripper vessel.

Catalyst is withdrawn from the bottom of stripping zone 32 into a spent catalyst conduit 36 that transfers spent catalyst to a hereinafter described regeneration zone. As catalyst is withdrawn from the bottom of the stripper, baffles 35 cascade the catalyst from side to side. The movement of the catalyst increases contact between the catalyst and the stripping fluid, in this case steam, that enters the bottom of the stripping zone. After the stripping fluid contacts the catalyst, it becomes mixed with hydrocarbon vapors that have been stripped from the catalyst.

In the stripping zone as shown in FIG. 1, the stripping zone operates at about the same temperature as that of the catalyst and product leaving the riser. At these temperatures contact of the catalyst with the stripping fluid will remove readily strippable hydrocarbons from the catalyst surface. As gas and vapors continue to rise in the stripper countercurrently to the flow of catalyst, the concentration of hydrocarbons in the stripping fluid increases. At the end of the stripping zone 32, a small portion of the stripping fluid will flow into disengaging zone 30 where it eventually enters the cyclone inlet 36 with the rest of the product vapors from the riser.

Spent catalyst taken from stripping zone 32 by spent catalyst conduit 36 is passed to a stripping vessel 62 (shown in FIG. 2) at a rate regulated by a control valve 40. Stripping vessel 62 houses a hot catalyst stripping zone 64 wherein the spent catalyst is mixed with a stripping fluid and hot regenerated catalyst particles. Hot catalyst stripping generally refers to the operation of a catalyst stripper at a temperature above the usual reactor temperature. In normal operation, this means that the stripper will have a temperature above at least 975° F. Greater advantages are obtained when the stripper is maintained above 1050° F.

The second or hot stripping zone of this invention is designed to maximize the removal of combustible material from the entering spent catalyst. Conditions within the stripping zone will typically include a temperature of from 1000–1200° F. Higher temperatures are preferred to maximize the removal of strippable compounds. Contact time within the stripping zone will vary from 1 to about 2 minutes. A relatively long stripping time is preferred in order to maximize the removal of strippable compounds. Although longer average residence times than 2 minutes may be used, it is not believed that such longer duration will offer substantial advantages or improvements. Most of the catalyst residence time occurs in the mixing portion where it may range from 30 seconds to 2 minutes or more. Residence times in the contacting portion will be shorter and will usually range from 5 to 20 seconds.

In the arrangement of this invention the hot stripping zone 64 operates with a mixing portion 67 and a contacting portion 69. As previously described, spent catalyst flows as previously described into mixing portion 67. Hot catalyst is carried by a transfer conduit 68 from a regeneration zone 70 at a rate regulated by a control valve 72. Mixing chamber 67 is operated to maintain a dense bed of catalyst in a lower region thereof. A fluidization gas enters the annular regions of the contacting portions 67 through one or more distributors 71. Passage of the fluidization gas through mixing section 67 promotes mixing and heat transfer between the two catalyst streams to establish a relatively uniform catalyst temperature within the mixing section. Catalyst in mixing section 67 operates as a dense back-mixed bed and, preferably, receives only a limited amount of fluidizing gas. Fluidizing gas typically enters mixing section 67 at a superficial gas velocity of less 1 ft/sec and more typically enters mixing section 67 at a superficial gas velocity of less 0.5 ft/sec. Thorough mixing of the catalyst in section 67 avoids thermal damage by limiting the amount—and preferably the type—of fluidizing gas that contacts the spent and regenerated catalyst until they are well mixed. Reducing localized regions of relatively higher temperature catalyst avoids thermal degradation that can occur when high volumes and/or more traditional fluidization gas such as steam contacts the high temperature catalyst. While steam may be used as the fluidization gas, it is preferably an inert low molecular weight material that will not promote thermal degradation of the catalyst. Preferably the mixing portion will have a low water concentration that is less than 50 mol %.

Where desired, catalyst coolers or other cooling devices that provide heat exchange with the catalyst may be used within the regeneration zone or on the transfer conduit 68. The use of such devices may reduce the temperature of the hot catalyst entering the stripping zone by up to about 30° F. When thermal damage to the catalyst is a substantial concern, such additional heat removal on the transfer conduit 68 may be beneficial.

Well-mixed catalyst spills over the open top 73 of a central partition 66 that segregates the contacting portion 69 from the mixing portion 67. The contacting portion 69 is located within stripping zone 64 with the upper level of partition 66 located below the top of catalyst bed 65. Catalyst pours over open top 73 by withdrawal of catalyst through a conduit 80 at a rate regulated by a control valve 81. A stripping gas conduit 83 injects a stripping gas, preferably steam, into the contacting portion 69. The injection rate for stripping gas entering the contacting portion 69 will usually fall in a range of from 1 to 2 lbs. of steam per 1000 lbs. of catalyst circulated through contacting portion 69. The stripping gas passes upwardly through a series of sloped baffles 85—similar to baffles 35 described in stripping section 32. The smaller section 69 allows a more concentrated and more complete contacting between the stripping medium and the catalyst than is possible in a large vessel. The contacting section can provide a relatively high ratio of stripping fluid to catalyst in a small volume zone to eliminate essentially all of the carryover of light hydrocarbon and hydrogen gases from the hot stripping zone into regeneration zone 70. The superficial gas velocity through the contacting portion can typically range from 0.2 to 1 ft/sec, but will more typically range from 0.5 to 0.7 ft/sec.

Stripping medium and stripped materials from both beds 67 and contacting portion 69 flow upwardly into the dilute phase zone of hot stripping vessel 62. The upper dilute phase may contain cyclones or other separators (not shown) to return any entrained catalyst to the dense bed of the stripping zone. A conduit 74 withdraws a primarily light gas stream from the stripping vessel 62. The light gas recovered from the hot stripping zone may be processed further for recovery of additional product components, may be vented off as waste gas or may be used as a fuel gas stream. Where a substantial amount of the gaseous mixture from conduit 74 is passed to the product recovery section of the FCC unit or other gas treating facilities, a cyclone is used to reduce the catalyst loading to these facilities.

Where the gas stream has sufficient pressure, a portion of it may be rerouted to the reactor riser and used as lift gas. The hot stripping medium and stripped materials will comprise steam and low molecular weight gases and will consist primarily of stripping fluid, highly cracked hydrocarbons and hydrogen. Because of the higher temperatures and longer duration of catalyst contact, the gas removed from a hot stripping zone has a very low molecular weight and is highly suitable for use as lift gas. Typically, the gaseous mixture withdrawn from the second stripping zone will contain, on a water-free basis, between 30–70% light paraffinic hydrocarbons. Lift gas typically has a low concentration of heavy hydrocarbons, i.e. hydrocarbons having a molecular weight of $C_3$ or greater are avoided.

The hot stripping zone also has the advantage of recovering sulfur and nitrogen compounds from the catalyst for removal with the light gas stream. Such recovery in the stripping zone reduces the amount sulfur and nitrogen species that are present for oxidation in the regeneration zone. Oxidized sulfur and nitrogen compound that exit with flue gas from the regeneration zone typically pose greater emission problems than the sulfur and nitrogen compounds found in the stripper effluent The fully stripped catalyst leaving the hot stripping zone through conduit 80 enters an inlet 82 for a lift riser 88. The hot catalyst enters the riser at a temperature typically in a range of from 1000° F. to 1200° F. Such temperatures readily initiate combustion of coke as it contacts an oxygen-containing transport gas that enters the bottom of the lift riser 88 through a conduit 90. Lift riser 88 may operate in dense phase or dilute phase conditions, but preferably, it operates as a dense phase lift conduit. Lifting the catalyst in dense phase reduces the volume of gas passing through the conduit and reduces the amount of oxygen entering the lift riser 88. Whether transported in dense or dilute phase, coke combustion will consume essentially all of the oxygen contained in the lift gas stream. Alternately, an oxygen-free transport gas may be used, but it is most convenient to use the lift conduit as an initial reaction zone to raise the temperature of the catalyst and to initiate coke combustion before catalyst enters the regeneration zone 70.

Figure 2:
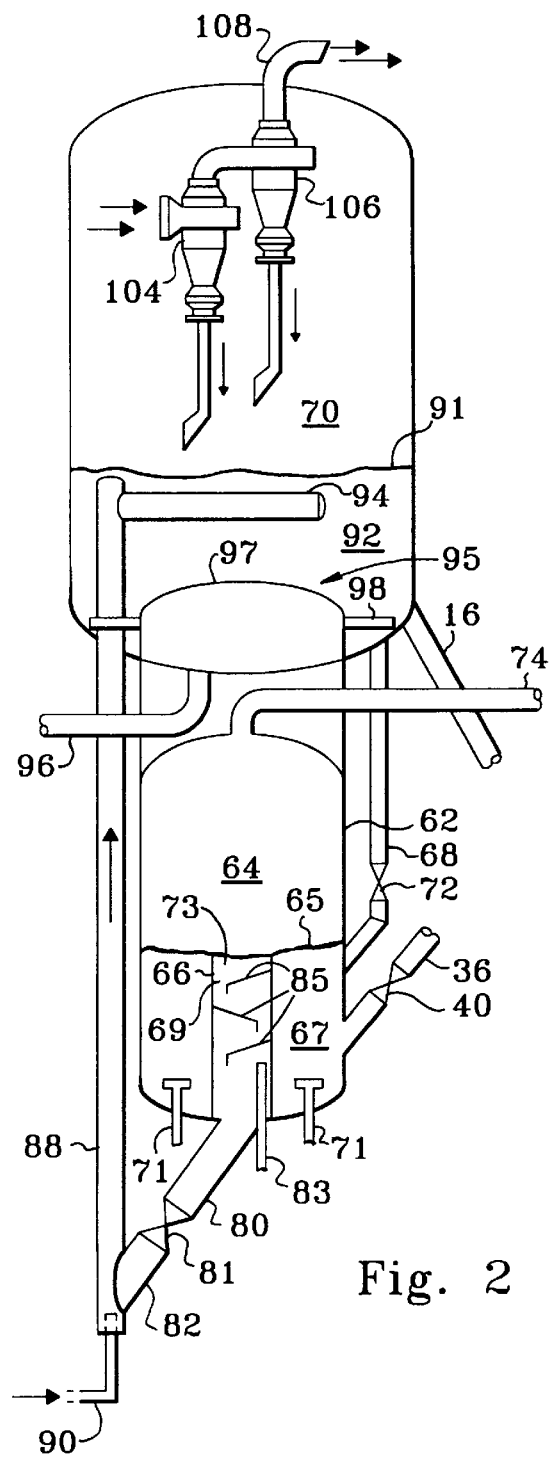
FIG. 2 is a sectional elevation view of a single stripping and regeneration zone arranged in accordance with this invention.

Lift riser 88 injects the catalyst and transport gas into an upper portion of a dense bed 92 contained in regeneration zone 70. Stripped catalyst particles are contacted with a regeneration gas and regenerated at a temperature of from 1200–1400° F. to remove remaining carbonaceous deposits from the surface of the catalyst particles and to generate hot regenerated catalyst particles. The arrangement depicted in FIG. 2 shows a distributor 94 that extends across bed 92 to promote a relatively uniform distribution of the spent catalyst across the upper bed surface. The distributor 94 is preferably located just below the surface 91 of bed 92. Regeneration zone 70 is operated with a dense phase bubbling bed. Distributing the partially regenerated catalyst across the upper surface of the bed promotes the consumption of any excess oxygen by maximizing the coke concentration at the top of the bed and thereby minimizing the potential for oxygen breakthrough across the surface of the bed. Injecting the initially regenerated catalyst just below the bed surface also minimizes the potential of any breakthrough of oxygen that may not be consumed in the transport fluid before it enters bed 92. Preferably, the oxygen concentration of the transport fluid as it exits 82 will be less than 5 mol % and, more preferably, less than 1 to 2 mol %.

Injecting the catalyst over the top of the bed also promotes a good distribution of the catalyst throughout the bed so that a primary air distributor 95 may provide a uniform distribution of air over the entire bed and further an even consumption of the oxygen in the combustion gas. The distributor 95 is located at the bottom of regeneration zone 70 and receives a combustion gas stream, typically compressed air, through a conduit 96. In the configuration of FIG. 2 distributor 95 has a perforated dome 97 that distributes the combustion gas over a central portion of bed 92 and a plurality of radially extended arms 98 that distribute perforations over the generally annular portion of the catalyst bed located directly above the arms. The dome and arm style arrangement leaves access to the bottom of the regeneration zone for the removal of catalyst through the outer annular region. However, the invention can be practiced with any type of combustion gas distributor that will provide a relatively uniform distribution of the combustion gas over the bottom of bed 92.

Transport gas from conduit 98 and spent combustion gas from distributor 95 rise upwardly into a dilute phase portion 70 above bed 92. Gases collected in upper section 70 will be essentially free of any excess oxygen concentration that could lead to combustion of the CO to $CO_2$ in the upper regeneration section. Preferably, the oxygen concentration of the gas will be less than 1 mol %. While any separation device can be used to separate catalyst from combustion gases that exit the dilute phase 70, FIG. 2 shows an ordinary arrangement of a primary cyclone 104 that receives the combustion gas and transfers it to a secondary cyclone 106 that removes further particulate matter. Cyclones 104 and 106 return the collected catalyst to bed 92 while an outlet 108 withdraws the combustion gas for suitable discharge which will usually include further processing for removal of additional particulate matter and combustion of the CO to $CO_2$. The spent combustion gas that exits the regeneration zone 70 through nozzle 108 will typically have a $CO_2$ to CO ratio of from 1 to 3 and, more preferably, the ratio of $CO_2$ to CO will be 2/1.

Partially regenerated catalyst exits bed 92 through conduit 68 for return to the hot stripping section or conduit 16 that returns catalyst to the previously described reactor riser. Regenerated catalyst withdrawn from the bed will usually have a coke content of 0.2 wt % to about 1 wt %. The coke content of the catalyst is kept at at least 0.2 wt % to avoid the presence of excess oxygen and the possibility of oxygen breakthrough from the bed that can lead to CO conversion primarily within the dilute phase of the regeneration zone.

The high to CO to $CO_2$ ratio obtained by this invention will usually reduce the need for additional heat removal from the regeneration zone. In addition, the extended time of hot stripping within the hot stripping zone combined with the effective contacting of the stripping gas will remove labile coke from the catalyst without its combustion and the subsequent heat production. The high temperature stripping operation leaves mainly graphitic coke on the catalyst surface. Hydrogen in the coke can be reduced by as much as 4 or 5 wt. % with the use of a hot stripping zone. Therefore, much of the coke, after the hot stripping, is graphitic in form.

The combination of the first stripping zone 50 provided below the reactor disengaging zone 30 with the second stripping zone 64 has the advantage of providing a first stripping section that removes less highly adsorbed hydrocarbon components from the catalyst surface before they are overcracked and while they still have substantial product value. Passing catalyst from the first stripping zone to the second stripping zone allows further hydrocarbons, hydrogen and strippable coke compounds to be removed from the catalyst surface. By this arrangement, the secondary hot stripping removes combustible material that—if left on the catalyst—would interfere with the regeneration process by increasing the amount of combustible material entering the regeneration zone the combustion of which releases more heat during the regeneration process.

Because of the reduced amount of combustible material that now enters the regeneration zone with the stripped catalyst, a dense bed temperature of between 1250–1300° F. may be maintained in dense bed 96. Lower regeneration temperatures are generally preferred in regeneration zone 70 for a number of reasons. Lower regeneration temperatures prevent deactivation of the catalyst and improve the control of metals on the catalyst. Lower regenerator temperatures also facilitate the use of $SO_X$ acceptor compounds in the catalyst—$SO_X$ acceptors are usually more effective at lower temperatures. For example, the hot stripping zone used in combination with a lower temperature regenerator zone and a $SO_X$ acceptor can reduce sulfur in coke from 1 to 0.1 wt. %.

The above description and drawings describe particular embodiments of this invention. The description and drawings are not meant to limit the scope of this invention to the particular embodiment shown therein.

What is claimed is:

1. A process for the fluidized catalytic cracking of hydrocarbons, said process comprising:
    a) contacting fluidized particles of regenerated FCC catalyst with a hydrocarbon feed at hydrocarbon conversion conditions to convert the hydrocarbons in the feed to lower boiling hydrocarbons and to produce a mixture of FCC catalyst and converted hydrocarbons;
    b) separating the mixture of FCC catalyst and converted hydrocarbons into a first gaseous effluent for recovery from the process and a separated catalyst carrying adsorbed and/or entrained hydrocarbons;
    c) passing the separated catalyst to a prefatory stripping zone and contacting the particles with a stripping gas to strip hydrocarbons from the separated FCC catalyst and from the void volume between catalyst particles to produce an initially stripped catalyst and a stripper stream comprising displaced hydrocarbons and stripping fluid that is recovered from the process;
    d) passing the initially stripped catalyst and regenerated catalyst from a hot regenerated catalyst stream to a heated stripping zone and mixing the initially stripped catalyst and the regenerated catalyst by injecting a fluidizing gas into a first segregated volume of the heated stripping zone to further strip the initially stripped catalyst of additional strippable materials and to produce a heated stripping catalyst;
    e) infilling a second, and relatively smaller, segregated volume of the heated stripping zone with heated stripping catalyst by withdrawing hot stripped catalyst from the bottom of the second segregated volume and contacting the heated stripping catalyst with a final stripping fluid in the second segregated volume to strip additional strippable compounds from the heated stripping catalyst and to produce the hot stripped catalyst;
    f) recovering a light gas stream comprising fluidizing gas, stripping fluid, light hydrocarbons and gaseous sulfur and nitrogen compounds from the heated stripping zone;
    g) injecting a transport fluid into a regenerator transport conduit to withdraw hot stripped catalyst from the bottom of the second segregated volume and to transport the hot stripped catalyst into a regeneration zone;
    h) discharging a stream of partially regenerated catalyst and gas from the transport conduit into an upper portion of a dense bubbling bed of catalyst contained within a regeneration zone wherein the discharged gas has an oxygen concentration of less than 5 mol %;
    i) passing an oxygen-containing regeneration gas upwardly through the dense bubbling bed of catalyst to regenerate the catalyst and produce regenerated FCC catalyst for contact with the hydrocarbon feed and the hot regenerated catalyst stream; and
    j) collecting a flue gas having a $CO_2/CO$ ratio of at least 1 from the regeneration zone.

2. The process of claim 1 wherein the heated stripping zone is located below the prefatory stripping zone and the regeneration zone and a catalyst is lifted from the heated stripping zone to the regeneration zone by the transport conduit.

3. The process of claim 1 wherein the fluidizing gas is injected into the second segregated volume at rate to provide a superficial gas velocity of at least 0.7 ft/sec.

4. The process of claim 1 wherein the superficial gas velocity through the second segregated volume exceeds the superficial gas velocity through the first segregated volume.

5. The process of claim 1 wherein the superficial gas velocity through the first segregated volume is less than 0.5 ft/sec.

6. The process of claim 1 wherein the $H_2O$ concentration of the fluidizing gas in the first segregated volume is less than 50 mol %.

7. The process of claim 1 wherein the transport fluid comprises air and the transport conduit provides a first stage of catalyst regeneration.

8. The process of claim 1 wherein the $CO_2/CO$ ratio is in a range of from 1 to 3.

9. The process of claim 1 wherein the second segregated volume passes the catalyst through a series of baffles.

10. The process of claim 1 wherein said initially stripped catalyst has an average residence time of from 1 to 2 min. in said second stripping zone.

11. The process of claim 1 wherein said regeneration zone operates at a temperature of between 1200 and 1400° F.

12. The process of claim 1 wherein said regeneration zone is operated at a temperature of less than 1300° F.

13. A process for the fluidized catalytic cracking of hydrocarbons, said process comprising:

a) contacting fluidized particles of regenerated FCC catalyst with a hydrocarbon feed at hydrocarbon conversion conditions in a riser conduit to convert the hydrocarbons in the feed to lower boiling hydrocarbons and to produce a mixture of FCC catalyst and converted hydrocarbons;

b) discharging the mixture of FCC catalyst and converted hydrocarbons from a riser and separating the mixture of FCC catalyst and converted hydrocarbons into a riser gaseous effluent for recovery from the process and separated catalyst carrying adsorbed and/or entrained hydrocarbons;

c) passing the separated catalyst to a substantially adiabatic stripping zone and contacting the particles with a stripping gas to strip hydrocarbons from the separated FCC catalyst and the void volume between catalyst particles to produce initially stripped catalyst and a stripper stream comprising displaced hydrocarbons and stripping fluid that is recovered with the riser gaseous effluent;

d) passing the initially stripped catalyst and regenerated catalyst from a hot regenerated catalyst stream to an outer portion of a heated stripping zone and mixing the initially stripped catalyst and regenerated catalyst in a dense bed by fluidization with a stripping fluid having an $H_2O$ concentration of less than 50 mol % that passes through the outer portion of the heated stripping zone at a superficial gas velocity of less than 1 ft/sec to produce heated stripping catalyst;

e) pouring hot stripping catalyst from the outer portion to an inner portion of the heated stripping zone by passing the catalyst over a separation baffle and withdrawing hot stripped catalyst from the bottom of the inner portion and contacting the heated stripping catalyst with a final stripping fluid in the inner portion to strip additional strippable compounds from the heated stripping catalyst and to produce the hot stripped catalyst;

f) recovering a light gas stream comprising stripping fluid, light hydrocarbons and gaseous sulfur and nitrogen compounds from the heated stripping zone;

g) injecting a transport fluid into a regenerator transport conduit to withdraw hot stripped catalyst from the bottom of the second segregated volume and to transport the hot stripped catalyst into a regeneration zone;

h) discharging a stream of partially regenerated catalyst and gas from the transport conduit into an upper portion of a dense bubbling bed of catalyst that provides a regeneration zone wherein the discharged gas has an oxygen concentration of less than 5 mol %;

i) passing an oxygen-containing regeneration gas through the dense bubbling bed of catalyst to regenerate the catalyst and produce regenerated FCC catalyst for contact with the hydrocarbon feed and the hot regenerated catalyst stream; and j) collecting a flue gas having a $CO_2/CO$ ratio of at least 1 from the regeneration zone.

* * * * *